United States Patent
Kobayashi et al.

(10) Patent No.: US 6,210,598 B1
(45) Date of Patent: Apr. 3, 2001

(54) MN-ZN FERRITE

(75) Inventors: Osamu Kobayashi; Koji Honda; Shunji Kawasaki, all of Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/374,760

(22) Filed: Aug. 16, 1999

(30) Foreign Application Priority Data

Aug. 19, 1998 (JP) .................................................. 10-249190
Feb. 8, 1999 (JP) .................................................. 11-029993

(51) Int. Cl.$^7$ .......................... C01G 47/00; C04B 35/38; H01F 1/34
(52) U.S. Cl. ..................... 252/62.62; 252/62.59; 252/62.58; 252/62.57
(58) Field of Search ............................. 252/62.62, 62.59, 252/62.58, 62.57

(56) References Cited

U.S. PATENT DOCUMENTS

| | | | |
|---|---|---|---|
| 3,674,694 | * 7/1972 | Stadler et al. | 252/62.62 |
| 4,963,281 | 10/1990 | Togane | 252/62.6 |
| 5,846,448 | * 12/1998 | Yasuhara | 252/62.62 |

FOREIGN PATENT DOCUMENTS

| | | |
|---|---|---|
| 11 77 538 | 6/1959 | (DE) . |
| 1 304 237 | 9/1970 | (GB) . |
| 1304237 | * 1/1973 | (GB) . |
| 5-198419 | 8/1993 | (JP) . |
| 6-140231 | 5/1994 | (JP) . |
| 6-325919 | 11/1994 | (JP) . |
| 7-230909 | 8/1995 | (JP) . |
| 7-297020 | 11/1995 | (JP) . |
| 9 180925 | 7/1997 | (JP) . |
| 9-180925 | * 7/1997 | (JP) . |
| 10-208926 | 8/1998 | (JP) . |

* cited by examiner

Primary Examiner—C. Melissa Koslow
(74) Attorney, Agent, or Firm—Oliff & Berridge, PLC

(57) ABSTRACT

A Mn—Zn ferrite having large electrical resistance, which can withstand use in high frequency region exceeding 1 MHz, is provided. The Mn—Zn ferrite comprises the following basic components: 44.0 to 50.0 mol % $Fe_2O_3$, 4.0 to 26.5 mol % ZnO, 0.1 to 8.0 mol % at least one member selected from the group consisting of $TiO_2$ and $SnO_2$, and the remainder being MnO.

By the addition of $TiO_2$ and $SnO_2$, even if the material is sintered in air, electrical resistance of $10^3$ times that of the conventional Mn—Zn ferrite can be obtained, and high initial permeability of 300 to 400 as estimated can be secured even at high frequency of 5 MHz.

5 Claims, 1 Drawing Sheet

MN-ZN FERRITE

BACKGROUND OF THE INVENTION

1. Field of the Invention

The present invention relates to a soft magnetic material, particularly a Mn—Zn ferrite suitable for low loss material for a transformer for switching power supply, a rotary transformer and deflection yoke, electronic parts such as for various kind of inductance elements and impedance elements for countermeasure against EMI, or for electromagnetic absorbers.

2. Description of the Related Art

Mn—Zn ferrite is one of the representative oxide magnetic material having a softmagnetism includes. Conventionally, this Mn—Zn ferrite generally has a basic component composition containing more than 50 mol %, 52 to 55 mol % on the average, of $Fe_2O_3$, 10 to 24 mol % of ZnO and the remainder being MnO in predetermined compositions. In general, the Mn—Zn ferrite is produced by mixing each of raw material powders of $Fe_2O_3$, ZnO and MnO, and the steps of calcination, milling, composition adjustment, granulation and pressing, and conducting sintering at 1,200 to 1,400° C. for 3 to 4 hours in reducing atmosphere which suppresses an oxygen concentration by flowing nitrogen gas. The reason for sintering under the above atomosphere is as follows. If the green compact is sintered in air when more than 50 mol % of $Fe_2O_3$ is contained, densification does not proceed sufficiently, so that a good soft magnetism is not obtained. Further, $Fe^{2+}$ formed by reduction of $Fe^{3+}$ has a positive crystal magnetic anisotropy, and has an effect to erase a negative crystal magnetic anisotropy of $Fe^{3+}$, thereby improving a soft magnetism. However, if sintering is conducted in an air, such a reduction reaction cannot be expected.

Where a Mn—Zn ferrite is used as a core material, eddy current flows as a frequency region used is increased, and loss by the eddy current increases. Therefore, in order to increase the upper limit of the frequency which can be used as a magnetic core material, it is necessary to make its electrical resistance large as much as possible. However, the electrical resistance in the above-described general Mn—Zn ferrite is a value smaller than 1 Ωm due to enjoyment of electrons between the above-described $Fe^{3+}$ and $Fe^{2+}$ (interionic), and the frequency which can be used is within the limit of about several hundreds of kHz. Initial permeability is considerably decreased in the frequency region exceeding 1 MHz, and properties as the soft magnetic material are entirely lost. In some instances, however, such a coutermeasure is employed that in order to increase the electrical resistance of Mn—Zn ferrite, CaO, $SiO_2$ and the like are added as additives to the above-described main components to make resistance of grain boundary high, and also sintering is conducted at low temperature of about 1,200° C. to reduce the grain size up to about 5 µm, thereby increasing the proportion of the grain boundary. However, it is difficult to obtain electrical resistance exceeding 1 Ωm even with such a countermeasure, and a fundamental solving approach is not yet attained.

SUMMARY OF THE INVENTION

The present invention has been completed in view of the above-described conventional problems.

Accordingly, an object of the present invention is to provide a Mn—Zn ferrite having high electrical resistance which can sufficiently withstand the use in a high frequency region exceeding 1 MHz.

In order to achieve the above-described object, according to a first aspect of the present invention, there is provided a Mn—Zn ferrite comprising the following basic components:

44.0 to 50.0 mol % $Fe_2O_3$, 4.0 to 26.5 mol % ZnO, 0.1 to 8.0 mol % at least one member selected from the group consisting of $TiO_2$ and $SnO_2$, and the remainder being MnO.

According to another aspect of the present invention, there is provided the Mn—Zn ferrite which further comprises at least one member selected from the group consisting of 0.005 to 0.200 mass % CaO and 0.005 to 0.050 mass % $SnO_2$.

The Mn—Zn ferrite according to the above-described aspects can further contain the following additives, if desired and necessary.

In one preferred embodiment, the Mn—Zn ferrite further contains at least one member selected from the group consisting of 0.010 to 0.200 mass % $V_2O_5$, 0.005 to 0.100 mass % $Bi_2O_3$, 0.005 to 0.100 mass % $In_2O_3$, 0.005 to 0.100 mass % PbO, 0.001 to 0.050 mass % $MoO_3$, and 0.001 to 0.050 mass % $WO_3$ as additives.

In another preferred embodiment, the Mn—Zn ferrite further contains at least one member selected from the group consisting of 0.010 to 0.200 mass % $ZrO_2$, 0.010 to 0.200 mass % $Ta_2O_5$, 0.010 to 0.200 mass % $HfO_2$, 0.010 to 0.200 mass % $Nb_2O_5$, and 0.010 to 0.200 mass % $Y_2O_3$ as additives.

In further preferred embodiment, the Mn—Zn ferrite further contains at least one member selected from the group consisting of 0.020 to 0.300 mass % $Cr_2O_3$ and 0.020 to 0.300 mass % $Al_2O_3$, as additives.

DETAILED DESCRIPTION OF THE INVENTION

Figure 1:
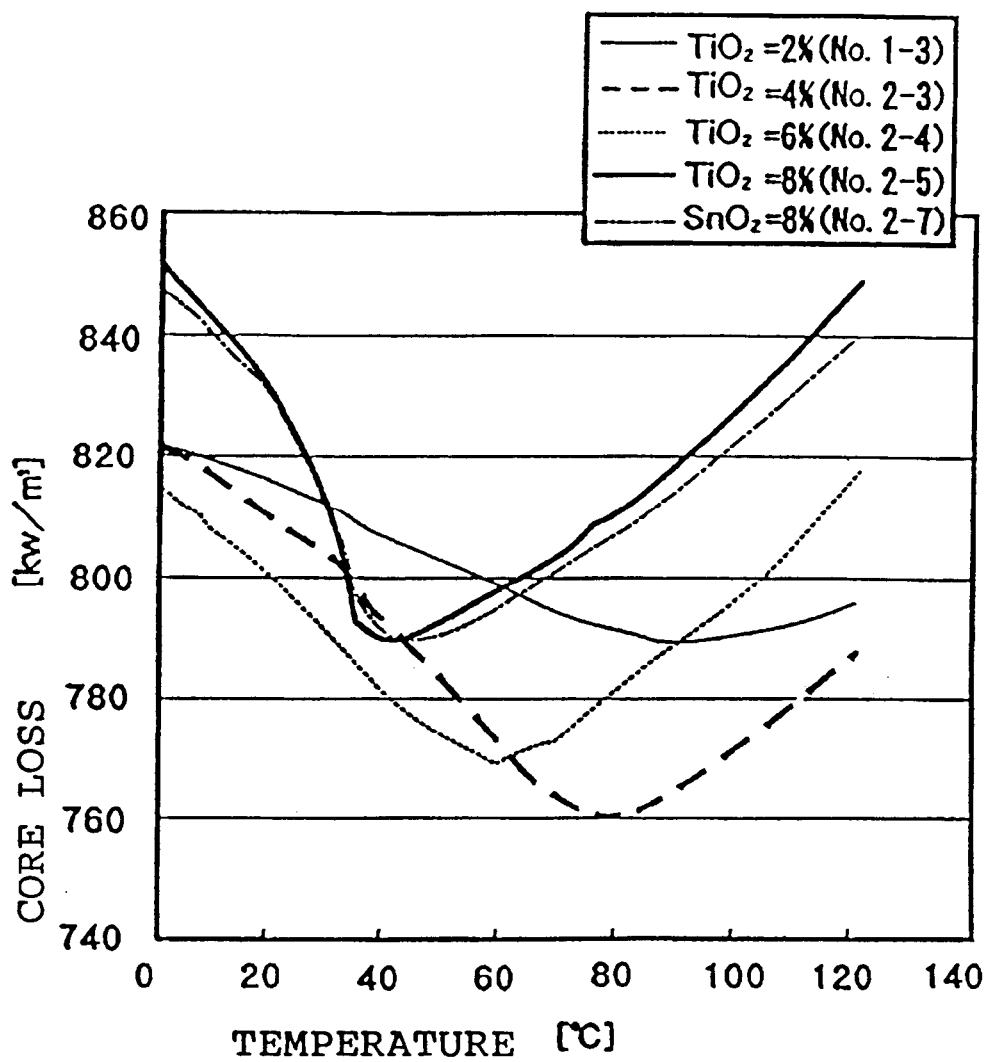
FIG. 1 is a graph showing the influence of temperature and the containing amount of $TiO_2$ and $SnO_2$ to the core loss.

The present invention newly contains at least one member selected from the group consisting of $TiO_2$ and $SnO_2$, in addtion to $Fe_2O_3$, ZnO and MnO which are basic components of the conventional Mn—Zn ferrite in order to provide a Mn—Zn ferrite which can sufficiently withstand use in a high frequency region exceeding 1 MHz. Such an oxide magnetic material has a basic composition comprising 44.0 to 50.0 mol % $Fe_2O_3$, 4.0 to 26.5 mol % ZnO, 0.1 to 8.0 mol % at least one member selected from the group consisting of $TiO_2$ and $SnO_2$, and the remainder being MnO.

Iron components in the Mn—Zn ferrite are present as $Fe^{3+}$ and $Fe^{2+}$. It is known that Sn and Ti receive electrons from $Fe^{3+}$ to form $Fe^{2+}$. Therefore, by containing those components, $Fe^{2+}$ can be formed even by sintering in air. The present invention makes it possible to obtain an excellent soft magnetism such that the contents of $SnO_2$ and/or $TiO_2$ in the basic component composition are made 0.1 to 8.0 mol %, thereby controlling the amount of $Fe^{2+}$ formed and optimizing the presence ratio of $Fe^{3+}$ and $Fe^{2+}$, so that positive and negative crystal magnetic anisotropies are compensated. Further, according to the present invention, since many $Sn^{4+}$ and $Ti^{4+}$ having the stable number of valency are present, exchange of electrons between $Fe^{3+}$ and $Fe^{2+}$ are substantially inhibited, and as a result, electrical resistance far larger than the conventional one (about $10^3$ times) can be obtained. However, if the content of $SnO_2$ and/or $TiO_2$ is less than 0.1 mol %, its effect is small, and on the other hand, if it exceeds 8.0 mol %, the initial permeability is decreased. Therefore, the content is limited to the above range of 0.1 to 8.0 mol %.

As described above, the present invention can obtain a sufficient soft magnetism even by sintering in air, but in order to further improve the soft magnetism, it is desirable to limit the $Fe_2O_3$ content to 50 mol % or less, thereby promoting the densification. However, if $Fe_2O_3$ is too small, it is caused to decrease in initial permeability. Therefore, $Fe_2O_3$ should contain at least 44.0 mol %. ZnO influences curie temperature and saturation magnetization. If ZnO is too large, the curie temperature is lowered, resulting in practical problem. On the other hand, if it is too small, saturation magnetization is decreased. Therefore, ZnO is desirably in the above-described range of 4.0 to 26.5 mol %.

It is known that CaO and $SiO_2$ make the grain boundary high resistance as described above. It is also known that those have the function to promote sintering of Mn—Zn ferrite. Therefore, adding CaO and $SiO_2$ as additives to the above-described basic component composition is effective in obtaining a highly dense magnetic material. In order to obtain the desired effect, it is necessary to contain CaO and $SiO_2$ in an amount of 0.005 mass % or more. However, if the amount thereof added is too large, abnormal grain growth occurs. Therefore, the upper limit of CaO should be 0.200 mass % and that of $SiO_2$ should be 0.050 mass %.

The Mn—Zn ferrite according to the present invention may contain at least one member selected from the group consisting of $V_2O$, $Bi_2O_3$, $In_2O_3$, PbO, $MoO_3$ and $WO_3$ as additives. These additives each is an oxide having low melting point and has a function to promote sintering. However, if the content of these components is small, its effect is small, and on the other hand, if it is too large, the abnormal grain growth is caused to occur. Therefore, the content of $V_2O_5$ is desirably 0.010–0.200 mass %; $Bi_2O_3$, $In_2O_3$, PbO 0.005–0.100 mass %; and $WO_3$ 0.001–0.050 mass %.

The Mn—Zn ferrite according to the present invention may contain at least one member selected from the group consisting of $ZrO_2$, $Ta_2O_5$, $HfO_2$, $NbO_2$ and $Y_2O_3$ as additives. These additives each is an oxide having high melting point and has a function to suppress grain growth. If crystal grains become small, electrical resistance is increased. Therefore, the initial permeability in high frequency region can be improved by containing those additiotives in appropriate amount. However, if the content of those components is small, its effect is small, and on the other hand, if it is too large, the initial permeability is decreased. Therefore, the content of each of those components is desirably 0.010 to 0.200 mass %.

The Mn—Zn ferrite according to the present invention may contain at least one of $Cr_2O_3$ and $Al_2O_3$ as additives. Those additives have the function to improve temperature characteristic of initial permeability. However, if the content thereof is too small, its effect is small, and on the other hand, if it is too large, the initial permeability is decreased. Therefore, the content of each of those components is desirably 0.020 to 0.300 mass %.

In producing Mn—Zn ferrite, each raw material powder of $Fe_2O_3$, ZnO, $TiO_2$ and/or $SnO_2$ and MnO as the main components are previously weighed in the predetermined proportions, and those are mixed to obtain a mixed powder. This powder is calcined and finely milled. The calcination temperature can select an appropriate temperature within the temperature range of 850 to 950° C., although varying depending on the objective composition. Further, the fine milling can be conducted with widely used ball mills. If desired, the powder of the above-described various additives are added in predetermined amount to the mixed fine powder and mixed to obtain a mixed powder having the objective composition. Granulation and pressing are conducted according to the conventional ferrite production process, and sintering is then conducted to obtain a sintered product. The granulation is conducted by adding binders such as polyvinyl alcohols, polyacryl amides, methyl cellulose, polyethylene oxides or glycerin. Further, the pressing is conducted by applying a pressure of, for example 80 MPa or more. Sintering is conducted by, for example, a method of maintaining at a temperature of, for example, 1,000 to 1,300° C. for an appropriate time period in air.

The Mn—Zn ferrite thus obtained contains $TiO_2$ and/or $SnO_2$ as the main components. Therefore, the electrical resistance is markedly increased as compared with the conventional Mn—Zn ferrite (about $10^3$ times).

Further, the limit of the initial permeability in a soft magnetic ferrite generally is inversely proportional to a frequency f (MHz) at which the ferrite is used, and is estimated by the value given by the equation of $(=K/f$ (K=1,500–2,000). According to the Mn—Zn ferrite of the present invention, the initial permeability of 300–400 as estimated in the frequency of 5 MHz can be obtained, and the ferrite is suitable as magnetic core materials and electromagnetic wave absorbers for high frequency exceeding 1 MHz.

The present invention is described in more detail by reference to the following Examples, but the invention should not be limited thereto.

EXAMPLE 1

Each raw material powder was mixed with ball mill such that $Fe_2O_3$ was 42.0–52.0 mol %, $TiO_2$ or $SnO_2$ was 2.0 mol %, and the remainder was MnO and ZnO having a molar ratio of 26:25. The resulting mixture was calcined at 900° C. for 2 hours in air, and then milled with ball mill for 20 hours to obtain a mixed powder. This mixed powder was adjusted in the components so as to have the above-described composition, and further mixed with ball mill for 1 hour. Polyvinyl alcohol was added to this mixed powder, and granulated. The resulting granulates were pressed into toroidal cores each having an outer diameter of 18 mm, an inner diameter of 10 mm and a height of 4 mm under a pressure of 80 MPa. Each green compact was placed in a sintering furnace, and sintered at 1,000° C. for 3 hours in air to obtain Samples 1-1 to 1-7 as shown in Table 1.

For the sake of comparison, each raw material powder was mixed with ball mill such that $Fe_2O_3$ was 52.5 mol %, MnO was 24.2 mol %, and ZnO was 23.3 mol %. The resulting mixture was calcined at 900° C. for 2 hours in air, and then milled with ball mill for 20 hours to obtain a mixed powder. This mixed powder was adjusted in the components so as to have the above-described composition, and 0.050 mass % of CaO and 0.010 mass % of $SiO_2$ were added thereto as additives. The resulting mixture was further mixed with ball mill for 1 hour. Polyvinyl alcohol was added to this mixed powder, and granulated. The resulting granulates were pressed into toroidal cores each having an outer diameter of 18 mm, an inner diameter of 10 mm and a height of 4 mm under a pressure of 80 MPa. Each green compact was placed in a sintering furnace, and sintered at 1,200° C.

for 3 hours in nitrogen atmosphere to obtain Sample 1-8 having the $Fe_2O_3$ content of more than 50 mol % as is same as the conventional one.

On each of Samples 1-1 to 1-8 obtained above, final component composition was confirmed by fluorescent X ray analysis, and also sintered density, initial permeability at 500 kHz and 5 MHz, and electrical resistance and core loss at 1 MHz and 50 mT were measured.

The results obtained are shown in Table 1 below.

%, and the remainder was MnO and ZnO having a molar ratio of 26:25. The resulting mixture was calcined at 900° C. for 2 hours in air, and then milled with ball mill for 20 hours to obtain a mixed powder. This mixed powder was adjusted in the components so as to have the above-described composition, and further mixed with ball mill for 1 hour. Polyvinyl alcohol was added to this mixed powder, and granulated. The resulting granulates were pressed into toroidal cores each having an outer diameter of 18 mm, an inner

TABLE 1

| SAMPLE NO. | SAMPLE | BASIC COMPONENT COMPOSITION (mol %) | | | | SINTERED DENSITY × $10^3$ (kg/cm$^3$) | ELECTRICAL RESISTANCE (Ωm) | INITIAL PERMEABILITY | | CORE LOSS (kW/m$^3$) |
|---|---|---|---|---|---|---|---|---|---|---|
| | | $Fe_2O_3$ | MnO | ZnO | $TiO_2$ | | | 500 kHz | 5 MHz | (1 MHz, 50 mT) |
| 1-1 | COMPARATIVE | 52.0 | 23.5 | 22.5 | 2.0 | 4.48 | 1.3 | 260 | 1 | >3000 |
| 1-2 | INVENTION | 50.0 | 24.5 | 23.5 | 2.0 | 4.81 | $1.8 \times 10^3$ | 1150 | 300 | 970 |
| 1-3 | INVENTION | 48.0 | 25.5 | 24.5 | 2.0 | 4.89 | $2.3 \times 10^3$ | 1590 | 390 | 820 |
| 1-4 | INVENTION | 46.0 | 26.5 | 25.5 | 2.0 | 4.92 | $2.4 \times 10^3$ | 1380 | 370 | 870 |
| 1-5 | INVENTION | 44.0 | 27.5 | 26.5 | 2.0 | 4.93 | $2.6 \times 10^3$ | 1050 | 320 | 980 |
| 1-6 | COMPARATIVE | 42.0 | 29.0 | 27.5 | 2.0 | 4.93 | $2.9 \times 10^3$ | 520 | 180 | 2190 |
| 1-7 | INVENTION | 48.0 | 25.5 | 24.5 | $SnO_2$ 2.0 | 4.90 | $2.2 \times 10^3$ | 1580 | 400 | 850 |
| 1-8 | COMPARATIVE | 52.5 | 24.2 | 23.3 | 0 | 4.88 | $1.5 \times 10^{-1}$ | 1590 | 1 | 1390 |

From the results shown in Table 1, Samples 1-2 to 1-5 and 1-7 (samples of the present invention) having the $Fe_2O_3$ content of 50.0 mol % or less each have sufficiently high sintered density, and also marked high electrical resistance and initial permeability at 500 kHz and 5 MHz and marked low in core loss, as compared with Sample 1 (comparative sample) having the $Fe_2O_3$ content of more than 50.0 mol %. Of the samples of the present invention, Sample 1-3 has the highest initial permeability. This is due to increase in electrical resistance. Further, Sample 1-6 as the comparative sample has the $Fe_2O_3$ content as small as 44.0 mol % or less, so that the initial permeability thereof at 500 kHz and 5 MHz is far lower as compared with that of the samples of the present invention. Further, Sample 1-8 having the $Fe_2O_3$ content of larger than 50 mol % as the same as in the conventional one is that the initial permeability at 5 MHz is decreased to the level 1 of the permeability of vacuum magnetic constant, and thus completely loses the characteristics as a soft magnetic material.

diameter of 10 mm and a height of 4 mm under a pressure of 80 MPa. Each green compact was placed in a sintering furnace, and sintered at 1,000° C. for 3 hours in air to obtain Samples 2-1 to 2-7 as shown in Table 2.

On each of Samples 2-1 to 2-7 obtained above, final component composition was confirmed by fluorescent X ray analysis, and initial permeability at 5 MHz and core loss at 1 MHz and 50 mT were measured, and as to Samples of the invention 1-3, 2-3, 2-4, 2-5 and 2-7, temperature property of core loss at 1 MHz and 50 mT was measured. The results are shown in Table 2 and FIG. 1.

TABLE 2

| SAMPLE NO. | SAMPLE | BASIC COMPONENT COMPOSITION (mol %) | | | | INITIAL PERMEABILITY 5 MHz | CORE LOSS (kW/m$^3$) (1 MHz, 40 mT) |
|---|---|---|---|---|---|---|---|
| | | $Fe_2O_3$ | MnO | ZnO | $TiO_2$ | | |
| 2-1 | COMPARATIVE | 48.0 | 26.5 | 25.5 | 0 | 40 | >3000 |
| 2-2 | INVENTION | 48.0 | 26.5 | 25.4 | 0.1 | 300 | 940 |
| 1-3 | INVENTION | 48.0 | 25.5 | 24.5 | 2.0 | 390 | 820 |
| 2-3 | INVENTION | 48.0 | 24.5 | 23.5 | 4.0 | 380 | 810 |
| 2-4 | INVENTION | 48.0 | 23.5 | 22.5 | 6.0 | 350 | 800 |
| 2-5 | INVENTION | 48.0 | 22.4 | 21.6 | 8.0 | 320 | 830 |
| 2-6 | COMPARATIVE | 48.0 | 21.4 | 20.6 | 10.0 | 220 | 1160 |
| 2-7 | INVENTION | 48.0 | 22.4 | 21.6 | $SnO^2$ 8.0 | 340 | 830 |

EXAMPLE 2

Each raw material powder was mixed with ball mill such that $Fe_2O_3$ was 48.0 mol %, $TiO_2$ or $SnO_2$ was 0–10.0 mol From the results shown in Table 2, Samples 1-3, 2-2 to 2-5 which contain an apprropriate amount of $TiO_2$ and Sample 2-7 which contains appropriate amount of $SnO_2$, each has remarkedly high initial permeability and low core loss as compared with Sample 2-1 (comparative sample) which does not contain $TiO_2$ at all. Further, the initial permeability of Sample 2-6 (comparative sample) containing relatively large amount of $TiO_2$ is high as compared with sample 2-1 (comparative sample) which does not contain $TiO_2$ at all and low in core loss, but the initial permeability becomes low and core loss becomes high as compared with Samples 1-3, 2-1 to 2-5 and 2-7 of the present invention.

Further, from the results shown in FIG. 1, for example, Sample 1-3 of $TiO_2=2.0$ mol % is small in influence of temperature change, which can be effectively used as ferrite for inductance elements and inpedance elements. In addition, although Samples 2-3 to 2-5 and 2-7 of the present invention which contains 4.0 to 8.0 mol % of $TiO_2$, the temperature which the minimum value of core loss scatters within 40 to 80° C., by making use of such temperature to be used in particular as ferrite having low loss it can be effectively used.

EXAMPLE 3

Each raw material powder was mixed with ball mill such that $Fe_2O_3$ was 48.0 mol %, MnO was 25.5 mol %, ZnO was 24.5 mol % and $TiO_2$ was 2.0 mol % (The same as in Sample 1-3 in Example 1). The resulting mixture was calcined at 900° C. for 2 hours in air, and then milled with ball mill for 20 hours to obtain a mixed powder. This mixed powder was adjusted in the components so as to have the above-described composition, and CaO or $Sio_2$ was added thereto as additives in various amounts as shown in Table 4. The resulting mixture was further mixed with ball mill for 1 hour. Polyvinyl alcohol was added to this mixed powder, and granulated. The resulting granulates were pressed into toroidal cores each having an outer diameter of 18 mm, an inner diameter of 10 mm and a height of 4 mm under a pressure of 80 MPa. Each green compact was placed in a sintering furnace, and sintered at 1,300° C. for 3 hours in air to obtain Samples 3-1 to 3-6 as shown in Table 3.

On each of Samples 3-1 to 3-6 obtained above, final component composition was confirmed by fluorescent X ray analysis, and also the sintered density and initial permeability at 5 MHz as measured.

The results obtained are shown in Table 3 below.

From the results shown in Table 3, in Samples 3-1, 3-2, 3-4 and 3-5 containing CaO or $SiO_2$ in appropriate amount (samples of the present invention), both sintered density and initial permeability are improved as compared with Sample 1-3 which does not contain those components at all (sample of the present invention in Example 1). However, in Samples 3-3 and 3-6 containing CaO or $SiO_2$ in slightly large amount (comparative samples), the sintered density is improved, but the initial permeability is decreased, as compared with the above-described samples of the present invention.

EXAMPLE 4

The predetermined amounts of $V_2O_5$, $Bi_2O_3$, $In_2O_3$, PbO, $MoO_3$ and $WO_3$ as additives were added to the mixed powder having the same component composition as in Example 3. The resulting mixed powder was mixed, granulated, pressed and sintered under the same conditions as in Example 3 to obtain Samples 4-1 to 4-14 as shown in Table 4.

On each of Samples 4-1 to 4-14 obtained above, final component composition was confirmed by fluorescent X ray analysis, and also the sintered density and initial permeability at 5 MHz was measured.

The results obtained are shown in Table 4 below.

TABLE 3

| SAMPLE | | BASIC COMPONENT COMPOSITION (mol %) | | | | ADDITIVE (mass %) | | SINTERED DENSITY × | INITIAL |
|---|---|---|---|---|---|---|---|---|---|
| NO. | SAMPLE | $Fe_2O_3$ | MnO | ZnO | $TiO_2$ | CaO | $SiO_2$ | $10^3$ (kg/m$^3$) | PERMEABILITY 5 MHz |
| 1-3 | INVENTION | 48.0 | 25.5 | 24.5 | 2.0 | 0 | 0 | 4.89 | 390 |
| 3-1 | INVENTION | 48.0 | 25.5 | 24.5 | 2.0 | 0.005 | 0 | 4.91 | 400 |
| 3-2 | INVENTION | 48.0 | 25.5 | 24.5 | 2.0 | 0.200 | 0 | 4.93 | 410 |
| 3-3 | COMPARATIVE | 48.0 | 25.5 | 24.5 | 2.0 | 0.300 | 0 | 4.94 | 280 |
| 3-4 | INVENTION | 48.0 | 25.5 | 24.5 | 2.0 | 0 | 0.005 | 4.91 | 400 |
| 3-5 | INVENTION | 48.0 | 25.5 | 24.5 | 2.0 | 0 | 0.050 | 4.94 | 420 |
| 3-6 | COMPARATIVE | 48.0 | 25.5 | 24.5 | 2.0 | 0 | 0.100 | 4.96 | 270 |

TABLE 4

| SAMPLE | | BASIC COMPONENT COMPOSITION (mol %) | | | | ADDITIVE (mass %) | | SINTERED DENSITY × | INITIAL PERMEABILITY |
|---|---|---|---|---|---|---|---|---|---|
| NO. | SAMPLE | $Fe_2O_3$ | MnO | ZnO | $TiO_2$ | KIND | CONTENT | $10^3$ (kg/m$^3$) | at 5 MHz |
| 1-3 | INVENTION | 48.0 | 25.5 | 24.5 | 2.0 | NONE | | 4.89 | 390 |
| 4-1 | INVENTION | 48.0 | 25.5 | 24.5 | 2.0 | $V_2O_5$ | 0.010 | 4.90 | 400 |
| 4-2 | INVENTION | 48.0 | 25.5 | 24.5 | 2.0 | $V_2O_5$ | 0.200 | 4.91 | 410 |
| 4-3 | COMPARATIVE | 48.0 | 25.5 | 24.5 | 2.0 | $V_2O_5$ | 0.300 | 4.95 | 290 |
| 4-4 | INVENTION | 48.0 | 25.5 | 24.5 | 2.0 | $Bi_2O_3$ | 0.005 | 4.91 | 410 |

TABLE 4-continued

| SAMPLE NO. | SAMPLE | BASIC COMPONENT COMPOSITION (mol %) | | | | ADDITIVE (mass %) | | SINTERED DENSITY × $10^3$ (kg/m$^3$) | INITIAL PERMEABILITY at 5 MHz |
|---|---|---|---|---|---|---|---|---|---|
| | | $Fe_2O_3$ | MnO | ZnO | $TiO_2$ | KIND | CONTENT | | |
| 4-5 | INVENTION | 48.0 | 25.5 | 24.5 | 2.0 | $Bi_2O_3$ | 0.100 | 4.94 | 430 |
| 4-6 | COMPARATIVE | 48.0 | 25.5 | 24.5 | 2.0 | $Bi_2O_3$ | 0.200 | 4.97 | 270 |
| 4-7 | INVENTION | 48.0 | 25.5 | 24.5 | 2.0 | $In_2O_3$ | 0.100 | 4.94 | 420 |
| 4-8 | INVENTION | 48.0 | 25.5 | 24.5 | 2.0 | PbO | 0.100 | 4.93 | 420 |
| 4-9 | INVENTION | 48.0 | 25.5 | 24.5 | 2.0 | $MoO_3$ | 0.001 | 4.90 | 400 |
| 4-10 | INVENTION | 48.0 | 25.5 | 24.5 | 2.0 | $MoO_3$ | 0.050 | 4.94 | 410 |
| 4-11 | COMPARATIVE | 48.0 | 25.5 | 24.5 | 2.0 | $MoO_3$ | 0.100 | 4.96 | 280 |
| 4-12 | INVENTION | 48.0 | 25.5 | 24.5 | 2.0 | $WO_3$ | 0.050 | 4.93 | 400 |
| 4-13 | INVENTION | 48.0 | 25.5 | 24.5 | 2.0 | $V_2O_5$ CaO | 0.200 0.200 | 4.93 | 410 |
| 4-14 | INVENTION | 48.0 | 25.5 | 24.5 | 2.0 | $V_2O_5$ $SiO_2$ | 0.200 0.050 | 4.93 | 420 |

From the results shown in Table 4, in Samples 4-1, 4-2, 4-4, 4-5, 4-7 to 4-10, and 4-12 to 4-14 containing $V_2O_5$, $Bi_2O_3$, $In_2O_3$, PbO, $MoO_3$ and $WO_3$ in appropriate amount (samples of the present invention), sintered density and initial permeability are improved as compared with Sample 1-3 which does not contain those components at all (sample of the present invention in Example 1). However, in Samples 4-3, 4-6 and 4-11 containing those additives in relatively large amount (comparative samples), sintered density is improved, but initial permeability is decreased, as compared with the above-described samples of the present invention.

EXAMPLE 5

The predetermined amounts of $ZrO_2$, $Ta_2O_5$, $HfO_2$, $Nb_2O_5$ and $Y_2O_3$ as additives were added to the mixed powder having the same component composition as in Example 3. The resulting mixed powder was mixed, granulated, pressed and sintered under the same conditions as in Example 3 to obtain Samples 5-1 to 5-9 as shown in Table 5.

On each of Samples 5-1 to 5-9 obtained above, final component composition was confirmed by fluorescent X ray analysis, and also grain size, initial permeability at 5 MHz and electrical resistance were measured.

The results obtained are shown in Table 5 below.

From the results shown in Table 5, in Samples 5-1, 5-2 and 5-4 to 5-9 containing $ZrO_2$, $Ta_2O_5$, $HfO_2$, $Nb_2O_5$ and $Y_2O_3$ in ap propriate amount (samples of the present invention), its grain size is small as 5 to 8 μm as compared with the grain size of 14 μm of Sample 1-3 which does not contain those components at al (sample of the present invention of Example 1), and due to this, the initial permeability is also improved. However, in the sample containing additives in relatively large amount as in Sample 5-3 (comparative sample), the grain size is decreased, but improvement effect of initial permeability is not recognized.

EXAMPLE 6

The predetermined amounts of $Cr_2O_3$ and $Al_2O_3$ as additives were added to the mixed powder having the same component composition as in Example 3. The resulting mixed powder was mixed, granulated, pressed and sintered under the same conditions as in Example 3 to obtain Samples 6-1 to 6-6 as shown in Table 6.

On each of Samples 6-1 to 6-6 obtained above, final component composition was confirmed by fluorescent X ray analysis, and also grain size, initial permeability at 5 MHz and temperature factor of initial permeability were measured. The temperature factor of initial permeability is an index showing temperature characteristic of initial permeability, and is given by the following equation.

$$\text{Temperature factor of initial permeability} = (\mu_2 - \mu_1)/\mu_1^2/(T_2 - T_1)$$

TABLE 5

| SAMPLE NO. | SAMPLE | BASIC COMPONENT COMPOSITION (mol %) | | | | ADDITIVE (mass %) | | GRAIN SIZE (μm) | INITIAL PERMEABILITY 5 MHz | ELECTRICAL RESISTANCE (Ωm) |
|---|---|---|---|---|---|---|---|---|---|---|
| | | $Fe_2O_3$ | MnO | ZnO | $TiO_2$ | KIND | CONTENT | | | |
| 1-3 | INVENTION | 48.0 | 25.5 | 24.6 | 2.0 | NONE | | 14 | 390 | $2.3 \times 10^3$ |
| 5-1 | INVENTION | 48.0 | 25.5 | 24.6 | 2.0 | $ZrO_2$ | 0.010 | 8 | 400 | $2.5 \times 10^3$ |
| 5-2 | INVENTION | 48.0 | 25.5 | 24.6 | 2.0 | $ZrO_2$ | 0.200 | 5 | 420 | $2.8 \times 10^3$ |
| 5-3 | COMPARATIVE | 48.0 | 25.5 | 24.6 | 2.0 | $ZrO_2$ | 0.300 | 4 | 290 | $2.9 \times 10^3$ |
| 5-4 | INVENTION | 48.0 | 25.5 | 24.6 | 2.0 | $HfO_2$ | 0.200 | 6 | 410 | $2.7 \times 10^3$ |
| 5-5 | INVENTION | 48.0 | 25.5 | 24.6 | 2.0 | $Ta_2O_3$ | 0.200 | 6 | 410 | $2.8 \times 10^3$ |
| 5-6 | INVENTION | 48.0 | 25.5 | 24.6 | 2.0 | $Nb_2O_5$ | 0.200 | 7 | 400 | $2.6 \times 10^3$ |
| 5-7 | INVENTION | 48.0 | 25.5 | 24.6 | 2.0 | $V_2O_3$ | 0.200 | 5 | 430 | $3.0 \times 10^3$ |
| 5-8 | INVENTION | 48.0 | 25.5 | 24.6 | 2.0 | $ZrO_2$ CaO | 0.200 0.200 | 5 | 430 | $2.9 \times 10^3$ |
| 5-9 | INVENTION | 48.0 | 25.5 | 24.6 | 2.0 | $ZrO_2$ $SiO_2$ | 0.200 0.050 | 5 | 430 | $3.0 \times 10^3$ | wherein $\mu_1$ is initial permeability at temperature $T_1$, and $\mu_2$ is initial permeability at temperature $T_2$ The results obtained are shown in Table 6.

TABLE 6

| SAMPLE NO. | SAMPLE | BASIC COMPONENT COMPOSITION (mol %) | | | | ADDITIVE (mass %) | | INITIAL PERMEABILITY | TEMPERATURE FACTOR OF INITIAL PERMEABILITY | |
|---|---|---|---|---|---|---|---|---|---|---|
| | | $Fe_2O_3$ | MnO | ZnO | $TiO_2$ | KIND | CONTENT | 5 MHz | −20 to 20° C. | 20 to 60° C. |
| 1-3 | INVENTION | 48.0 | 25.5 | 24.5 | 2.0 | NONE | | 390 | $15 \times 10^{-6}$ | $11 \times 10^{-6}$ |
| 6-1 | INVENTION | 48.0 | 25.5 | 24.5 | 2.0 | $Cr_2O_3$ | 0.020 | 390 | $9 \times 10^{-6}$ | $8 \times 10^{-6}$ |
| 6-2 | INVENTION | 48.0 | 25.5 | 24.5 | 2.0 | $Cr_2O_3$ | 0.300 | 380 | $7 \times 10^{-6}$ | $5 \times 10^{-6}$ |
| 6-3 | COMPARATIVE | 48.0 | 25.5 | 24.5 | 2.0 | $Cr_2O_3$ | 0.600 | 260 | $6 \times 10^{-6}$ | $5 \times 10^{-6}$ |
| 6-4 | INVENTION | 48.0 | 25.5 | 24.5 | 2.0 | $Al_2O_3$ | 0.300 | 390 | $9 \times 10^{-6}$ | $8 \times 10^{-6}$ |
| 6-5 | INVENTION | 48.0 | 25.5 | 24.5 | 2.0 | $Cr_2O_3$ CaO | 0.300 0.200 | 390 | $7 \times 10^{-6}$ | $8 \times 10^{-6}$ |
| 6-6 | INVENTION | 48.0 | 25.5 | 24.5 | 2.0 | $Cr_2O_3$ $SiO_2$ | 0.300 0.050 | 400 | $8 \times 10^{-6}$ | $8 \times 10^{-6}$ |

From the results shown in Table 6, in Sample 6-1, 6-2 and 6-4 to 6-6 containing $Cr_2O_3$ and $Al_2O_3$ in appropriate amount (samples of the present invention), the temperature factor of initial permeability is small to the grain size of Sample 1-3 which does not contain those components at all (sample of the present invention in Example 1), and temperature characteristic is improved. However, in the sample containing additives in relatively large amount as in Sample 6-3 (comparative sample), the temperature factor of initial permeability is decreased, but the initial permeability is decreased.

As described above, the Mn—Zn ferrite according to the present invention can obtain markedly large electrical resistance and excellent initial permeability as compared with the conventional Mn—Zn ferrite, and can sufficiently withstand use in the high frequency region exceeding 1 MHz. Thus, the Mn—Zn ferrite is suitable as magnetic core materials and electromagnetic wave absorbers for high frequency.

Further, the Mn—Zn ferrite according to the present invention enables Mn—Zn ferrite having the $Fe_2O_3$ content of 50 mol % or less to sinter in air by containing $TiO_2$ and $SnO_2$. As a result, the Mn—Zn ferrite greatly contributes to improvement in productivity, and decrease in production cost.

What is claimed is:

1. A Mn—Zn ferrite comprising the following basic components:
   44.0 to less than 50.0 mol % $Fe_2O_3$,
   4.0 to 26.5 mol % ZnO,
   0.1 to 8.0 mol % at least one member selected from the group consisting of $TiO_2$ and $SnO_2$,
   at least one member selected from the group consisting of 0.005 to 0.200 mass % CaO and 0.005 to 0.050 mass % $SiO_2$ as additives, and
   the remainder being MnO.

2. The Mn—Zn ferrite as claimed in claim 1, which further comprises at least one member selected from the group consisting of
   0.010 to 0.200 mass % $V_2O_5$,
   0.005 to 0.100 mass % $Bi_2O_3$,
   0.005 to 0.100 mass % $In_2O_3$,
   0.005 to 0.100 mass % PbO,
   0.001 to 0.050 mass % $MoO_3$, and
   0.001 to 0.050 mass % $WO_3$
   as additives.

3. The Mn—Zn ferrite as claimed in claim 1, which further comprises at least one member selected from the group consisting of
   0.010 to 0.200 mass % $ZrO_2$,
   0.010 to 0.200 mass % $Ta_2O_5$,
   0.010 to 0.200 mass % $HfO_2$,
   0.010 to 0.200 mass % $Nb_2O_5$, and
   0.010 to 0.200 mass % $Y_2O_3$
   as additives.

4. The Mn—Zn ferrite as claimed in claim 1 which further comprises at least one member selected from the group consisting of 0.020 to 0.300 mass % $Cr_2O_3$ and 0.020 to 0.300 mass % $Al_2O_3$, as additives.

5. A Mn—Zn ferrite consisting essentially of the following basic components:
   44.0 to 50.0 mol % $Fe_2O_3$,
   4.0 to 26.5 mol % ZnO,
   0.1 to 8.0 mol % of at least one member selected from the group consisting of $TiO_2$ and $SnO_2$,
   at least one member selected from the group consisting of 0.005 to 0.200 mass % CaO and 0.005 to 0.050 mass % $SiO_2$ as additives, and
   the remainder being MnO.

* * * * *